E. U. G. REAGAN.
DIFFERENTIAL CONSTRUCTION.
APPLICATION FILED DEC. 6, 1915.
1,266,712. Patented May 21, 1918.
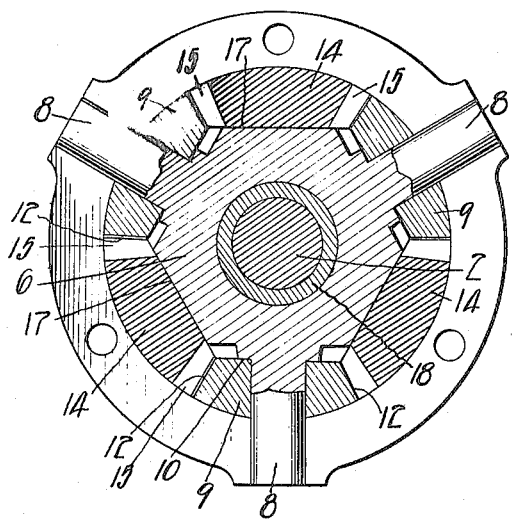
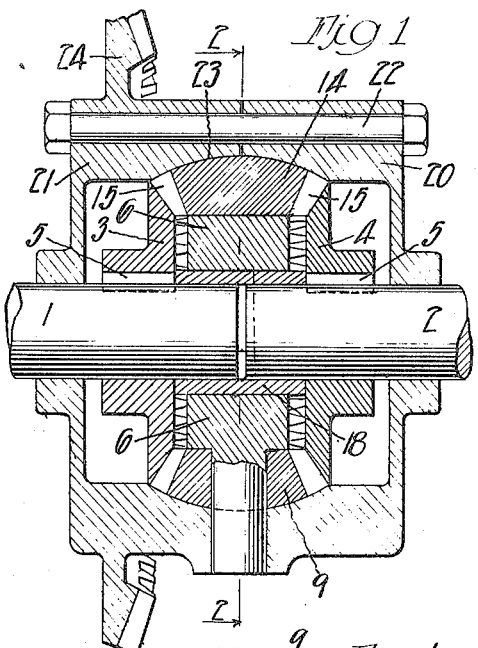
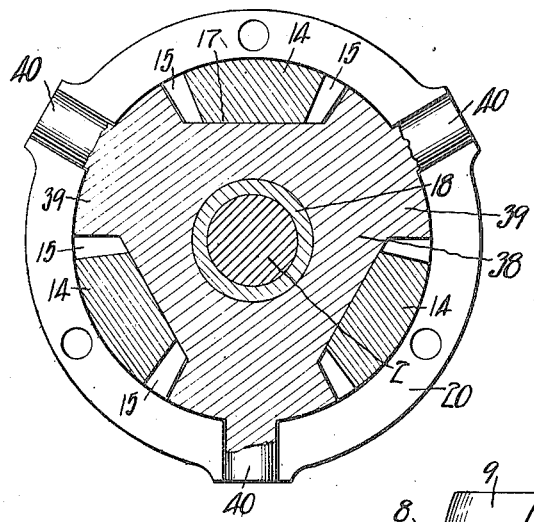
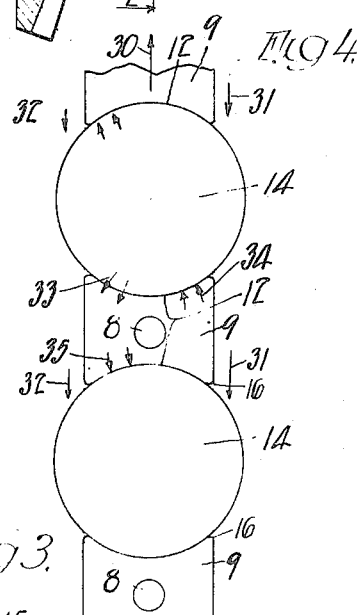
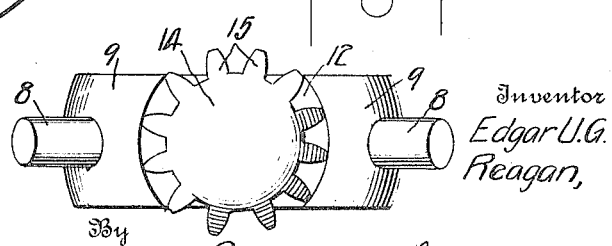
Witness
E. R. Barritt
Inventor
Edgar U. G. Reagan,
By Pagelsen & Spencer, Attorneys

UNITED STATES PATENT OFFICE.

EDGAR U. G. REAGAN, OF SAN ANTONIO, TEXAS.

DIFFERENTIAL CONSTRUCTION.

1,266,712. Specification of Letters Patent. Patented May 21, 1918.

Application filed December 6, 1915. Serial No. 65,170.

*To all whom it may concern:*

Be it known that I, EDGAR U. G. REAGAN, a citizen of the United States, and residing at San Antonio, in the county of Bexar and State of Texas, have invented a new and Improved Differential Construction, of which the following is a specification.

It is common knowledge that when one of the driving wheels of a motor vehicle sinks in the mud and the other remains on hard ground, or when the resistance offered to rotation of the wheels is rendered disproportionate in any other manner, a tendency results to spin the wheel to which the least resistance is imposed, and that practically all of the power of the engine is lost when the spinning takes place. Efforts have been made to prevent this spinning but they have heretofore, because of initial cost, number of parts or for other reasons, failed to go into general use.

The object of the present invention is to provide a differential particularly suitable for motor vehicles (although of application generally wherever a divided shaft is to be driven from a single source of power) whereby the spinning of the wheels (or other driven elements) is effectually prevented while the relative movement thereof necessary in passing around curves is freely allowed. The purpose of the invention is also to provide a differential construction which may be easily substituted as a whole for differentials in common use; and its purpose is further to provide elements which, when substituted for elements of ordinary differentials, combine with the elements retained and form a construction having the properties outlined at the beginning of this paragraph. In short, the present invention aims to secure a practical and commercial differential whereby all necessary relative movement of the driving wheels is allowed, and whereby undesirable relative movement is prevented.

The invention will be better understood from a consideration of construction shown, described and particularly pointed out in the claims.

In the drawings, Figure 1 is a longitudinal section through a preferred embodiment of my invention. Fig. 2 is a section on the line 2—2 of Fig. 1. Fig. 3 is a plan view of the spider, one of the force distributing pinions being shown in position thereon. Fig. 4 is a diagram illustrating the course of the major forces. Fig. 5 is a view, similar to Fig. 2, showing a modification.

Like reference characters refer to like parts throughout the several views.

1 and 2 indicates alined shafts, preferably the halves of the usual driving axle of a motor vehicle, to which the driven bevel gears or other rotatable members 3 and 4 are respectively secured, for example, by keys 5. Between the gears is placed a rotatable driving member or spider 6 from which a series of pins or trunnions 8 project radially; and mounted to swing freely on each of the trunnions is a seat or bearing 9 that may, if desired, engage a shoulder 10 (Fig. 2) formed at the base of the corresponding trunnion. The opposite faces 12 of the seats are substantially surface elements of cones, the apexes of which preferably lie on the bisectors of the angles between the trunnions and through the axis of the shafts 1—2. Alternating with the seats are the rotatable bevel pinions or force distributing members 14, some of the teeth 15 of which are in floating engagement with the conical surfaces of the adjacent pair of seats while others mesh with those of the gears 3—4; putting it another way, the conical surfaces form an external bearing in which the corresponding pinion turns and with respect to which it is shiftable laterally to a slight extent. In order to prevent engagement of the teeth with the edges of the seats, the latter are preferably curved as indicated at 16 in Fig. 4. The spider 6 may, if desired, be faced at 17 to form flat surfaces against which the inner ends of the pinions may rest; and it is preferred to interpose between the spider and the ends of the shafts 1—2 a bushing or bearing sleeve 18.

The elements heretofore described are inclosed in a suitable housing which may comprise the halves 20 and 21 rigidly connected by the bolts 22. The meeting faces of the halves are shaped to conform to the projecting ends of the trunnions 8, and form seats 23, preferably spherical, for the outer ends of the pinions, the latter being likewise preferably of spherical configuration. Turning force is applied to the housing in any desired manner, preferably through the bevel gear 24 which may be made integral therewith.

It will be observed that the gears 14, which may be termed "planetary," are carried in suitable chambers (see particularly Fig. 1) formed within the casing, and that the gears are mounted to rotate in said chambers without the use of a shaft or spindle.

Operation.

Power applied to the housing is transmitted to the trunnions 8 and causes the spider to rotate, the seats 9 being, of course, carried therewith. Engagement of these seats with the force distributing members 14 transmits the force directly to them, and if the resistance offered to the gears 3—4 is equal, they are carried at equal rates, there being no turning of the members 14 in respect to the seats. Should the vehicle be traveling on a curve, the necessary relative movement of the axle sections is readily allowed, the pinions 14 merely riding around on the teeth of the gear corresponding to the inner wheel in the ordinary way. However, should the resistance offered to rotation of one of the shafts become appreciably greater than that offered to the other (as when one of the wheels is in a mud hole), a different action arises, which will be better understood from a consideration of Fig. 4. Assuming the spider is being carried forward in the direction indicated by the arrow 30, the force is, of course, transmitted directly to the seats 9 and from them to the pinions 14 ahead, and if the resistances offered by the gears 3—4 were equal there would be no tendency for the seats 9 to turn in either direction from a neutral position on the trunnions. The gears 3—4 offering, on the contrary, a greater resistance and a lesser resistance, indicated respectively by the arrows 31 and 32, the force balance is disturbed, and the pinions are crowded to the left (Fig. 4) and bear heavily upon the left end of the corresponding seats, as shown by the arrows 33; this turns the seats counterclockwise about the trunnions and applies forces to the right hand rear side of the particular pinion under consideration, and to the left hand front side of the following pinion, as indicated respectively by the arrows 34 and 35. It will be understood that the arrows merely show approximately the course and nature of the forces, but the net result is that, under the conditions shown in Fig. 4, the tendency of the pinions to turn clockwise in the seats is largely or wholly overcome. The conditions are obviously reversed when the resisting forces are interchanged.

The modified construction shown in Fig. 5 differs from that heretofore described merely in that the spider 38, which corresponds to the spider 6, includes as an integral part thereof seats 39 of the same shape as the seats 9. The action also differs in that, since the seats are incapable of swinging, the pinions are merely shifted laterally away from the gear offering the greatest resistance and into binding engagement with the forward and rear surfaces of the adjacent seats. The projections 40 which correspond to the trunnions 8, might be of any desired cross-section.

In either construction the differential may be readily substituted for those in ordinary use, but that first described not only has the technical advantage outlined, but is also particularly important commercially in that the spider 6 is of the usual form. It is, therefore, only necessary to substitute for the pinions that are commonly carried on the trunnions 8, the seats 9 and to further provide the pinions 14 in order to equip used cars with my improvement.

It is obvious that many changes may be made in the construction of the device without departing from the spirit of my invention. I do not, therefore, wish to be limited otherwise than as indicated by the subjoined claims.

I claim:—

1. A differential comprising a driving means, two driven members, a force distributing member interposed between the driving means and the driven members, said driving means including a seat and said force distributing member floating in respect to the seat.

2. A differential comprising a driving member, two driven members, a rotatable force distributing member interposed between the driving member and the driven members, said driving member including a seat and said force distributing member floating in respect to the seat.

3. A differential comprising a driving member, two driven gears, shafts to which the gears are respectively attached, a rotatable force distributing pinion interposed between the driving member and the driven gears, said driving member including a seat and said force distributing pinion floating in respect to the seat.

4. A differential comprising a driving member, two driven gears, shafts to which the gears are respectively attached, a rotatable force distributing pinion interposed between the driving member and the driven gears, said driving member including a seat and said force distributing pinion floating in respect to the seat with its teeth bearing thereon.

5. A differential comprising driving means, two driven gears, shafts for the gears, a rotatable force distributing pinion interposed between the driving means and the driven gears, said driving means including a seat and said force distributing pinion floating in respect to the seat.

6. A differential comprising driving means, two driven gears, shafts for the gears, a rotatable force distributing pinion interposed between the driving means and the driven gears, said driving means including a pair of spaced seats that together form an external bearing for said force distributing pinion, the curvature of the seats being less sharp than that of the pinion, whereby the latter is allowed to both rotate and shift laterally to wedge against the seats.

7. A differential construction comprising two driven gears, shafts to which the gears are respectively attached, a rotatable force distributing pinion in mesh with the gears, a force transmitting seat upon which the teeth of the pinion bear, the curvature of the seat being less sharp than that of the pinion whereby the latter is allowed to both rotate and shift laterally to wedge itself against the seat, and means for applying driving force to the seat.

8. A differential comprising a driving element, two driven gears, shafts to which the gears are respectively attached, a rotatable force distributing pinion interposed between the driving member and the driven gears, said driving member including a seat and said force distributing pinion floating in the seat with its teeth bearing thereon, said seat being pivoted to swing in respect to another portion of the driving element and transversely of the pinion and being arranged to grip the latter when in one position.

9. A differential construction comprising two driven gears, shafts to which the gears are respectively attached, a rotatable force distributing pinion in mesh with the gears, a force transmitting seat in which the pinion floats and upon which it bears, a force applying means, said seat being pivoted to swing on the force applying means in either direction from a neutral position and transversely of the pinion and when so swung clamping the pinion against rotation.

10. A differential construction comprising two driven gears, shafts to which the gears are respectively attached, a rotatable force distributing pinion in mesh with the gears, a force transmitting seat in which the pinion is mounted and in respect to which it floats longitudinally of the shafts, means for applying driving force to the seat whereby, when the resistance offered by one of the gears to the force distributing pinion becomes appreciably less than that offered by the other gear, the pinion is forced against the seat and its tendency to rotate therein is largely overcome, and whereby an extra amount of force is transmitted to the gear to which the greatest resistance is imposed.

11. A differential construction comprising two alined driven shafts, bevel gears carried by the shafts, said gears facing each other, a rotatable driving means between the gears, said driving means including spaced seats having opposed bearing surfaces in the shape of portions of the surface of a frustum of a cone, a bevel pinion floating between said bearing surfaces and having its teeth meshing with those of the gears, whereby when the resistance to rotation offered by one of the gears becomes appreciably less than that offered by the other the pinion is wedged between the seats to prevent rotation of the gear to which the least resistance is offered relative to the gear to which the greatest resistance is offered.

12. A differential construction comprising two driven shafts having parallel axes, gears on the shafts, a rotatable driving means between the gears, said driving means including spaced seats having opposed bearing surfaces forming parts of the same surface of revolution, a pinion floating between said bearing surfaces and having its teeth meshing with those of the gears, whereby when the resistance to rotation offered by one of the gears becomes appreciably less than that offered by the other the pinion is wedged between the seats to prevent rotation of the gear to which the least resistance is offered relative to the gear to which the greatest resistance is offered.

13. A differential construction comprising rotatable driving means, a pair of alined shafts, two driven bevel pinions, one on each shaft, said pinions facing each other, a rotatable force distributing bevel pinion interposed between the driving means and the driven gears and in mesh with the latter, said driving means including a pair of spaced seats that together form an external bearing for said force distributing pinion, whereby when the resistance offered by the driven gears becomes disproportionate the pinion is forced laterally toward the gear having the least resistance to wedge the pinion between the seats, and rotation of the last mentioned gear in respect to the other gear is prevented.

14. A differential construction comprising two alined driven shafts, bevel gears carried by the shafts, said gears facing each other, a rotatable driving means between the gears, said driving means including spaced seats having opposed bearing surfaces in the shape of portions of the surface of a frustum of a cone, said seats being pivoted to swing about radii of the driving member, a bevel pinion floating between said bearing surfaces and having its teeth meshing with those of the gears, whereby when the resistance to rotation offered by one of the gears becomes appreciably less than that offered by the other the pinion is wedged between the seats and the latter are rotated about their axes to grip the pinion and prevent rotation of the gear to which the least resistance is offered relative to the gear to which the greatest resistance is offered.

15. A differential comprising a driving member, two driven gears, shafts to which the gears are respectively attached, a rotatable force distributing pinion interposed between the driving member and the driven gears, said driving member including a seat and said force distributing pinion floating in respect to the seat, a housing inclosing the ends of the shafts and the other members, said pinion being retained in the seat by the housing.

16. A differential construction comprising two alined driven shafts, bevel gears carried by the shafts, said gears facing each other, a rotatable driving means between the gears, said driving means including spaced seats having opposed bearing surfaces in the shape of portions of the surface of a frustum of a cone, a bevel pinion floating between said bearing surfaces and having its teeth meshing with those of the gears, whereby when the resistance to rotation offered by one of the gears becomes appreciably less than that offered by the other the pinion is wedged between the seats to prevent rotation of the gear to which the least resistance is offered relative to the gear to which the greatest resistance is offered, a housing inclosing the ends of the shafts and the other members, said pinion being retained in the seat by the housing.

17. A differential gearing for transmitting force from a driving means to two bevel gears connected to the ends of alined shafts and from either gear to the other consisting of a driving means having tapering pockets in its periphery, and bevel pinions in said pockets between and meshing with said bevel gears, said pinions engaging the walls of said pockets along the points of the teeth to thereby receive the force to be transmitted.

18. A differential construction comprising driving means, two driven gears, shafts to which the gears are respectively attached, a rotatable force distributing member through which driving force for the gears is transmitted, said driving means including a seat and said force distributing member in said seat, said seat and said force distributing member being of such relative dimensions, that the force distributing member is free to shift slightly in the seat at an angle to its axis of rotation to grip tightly against the seat.

19. A differential construction comprising driving means, two driven shafts having parallel axes, gears on the shafts, a rotatable force distributing member through which driving force for the gears is transmitted, said driving means including a pair of spaced seats and said force distributing member between said seats, said seats and said force distributing member being of such relative dimensions that the force distributing member is free to shift slightly at an angle to its axis of rotation to grip tightly against the seats.

20. A differential construction comprising driving means, two driven shafts having parallel axes, gears on the shafts, a rotatable force distributing member through which driving force for the gears is transmitted, said driving means including a pair of spaced seats having opposed bearing surfaces forming parts of the same surface of revolution, said force distributing member floating in said seat, whereby when the resistance offered by one of the driven gears becomes appreciably less than that offered by the other, the force distributing member is forced laterally toward the gear having the least resistance and wedged between the seats to cause an extra amount of force to be transmitted to the gear having the greatest resistance.

21. A differential construction comprising two driven gears, shafts to which the gears are respectively attached, said shafts being capable of rotating relative to one another, driving means for the gears, said driving means including a seat and a member rotatable in respect to said seat the relative dimensions of the seat and the rotatable member being such that the rotatable member may shift bodily slightly in reference to the seat to establish an abnormally large amount of resistance to any tendency which it may have to rotate whereby a small resistance offered to one of the driven gears causes a large proportion of the turning force to be transmitted to the other gear when a relatively large resistance is offered thereto.

22. A differential construction comprising two driven gears, shafts to which the gears are respectively attached, said shafts being capable of rotating relative to one another, driving means for the gears, said driving means including a seat and a member rotatable in respect to said seat the relative dimensions of the seat and the rotatable member being such that the rotatable member may shift bodily slightly in reference to the seat to establish an abnormally large amount of resistance to any tendency which it may have to rotate whereby a small resistance offered to one of the driven gears causes a large proportion of the turning force to be transmitted to the other gear when a relatively large resistance is offered thereto, said floating rotatable member being in toothed engagement with one of the driven gears.

23. A differential construction comprising two driven gears, shafts to which the gears are respectively attached, said shafts being capable of rotating relative to one another, driving means for the gears, said driving means including a seat and a member rotatable in respect to said seat, said member also having movement in respect to said seat at an angle to its axis of rotation to establish an abnormal amount of resistance to its own rotation whereby the seat is caused to offer an increased resistance to rotation of the rotatable member and whereby a small resistance offered to one of the driven gears causes a large proportion of the turning force to be transmitted to the other gear when a relatively large resistance is offered thereto.

24. A differential construction comprising two driven gears, shafts to which the gears are respectively attached, said shafts being capable of rotating relative to one another, driving means for the gears, said driving means including a force applying member, a seat, movable in respect to the force applying member, to which the force is applied, and a member rotatable in respect to said seat and also having slight bodily movement in respect thereto to establish an abnormal amount of resistance to its own rotation.

25. In a differential gear, a planetary gear carrier having chambers formed therein, a floating gear mounted to rotate within each chamber without the use of a shaft, an axle section driving gear engaging said floating gears, and means to rotate the planetary gear carrier.

26. In a differential gear, a planetary gear carrier comprising a casing having chambers formed therein, a floating gear mounted to rotate within each chamber without the use of a shaft, an axle section driving gear arranged within the casing and engaging said floating gears, and means to rotate the casing.

27. In a differential gear, a planetary gear carrier comprising a casing, floating gears mounted to rotate in the casing without the use of shafts, an axle section driving gear arranged within the casing and engaging said floating gears, and means to rotate the casing.

28. In a differential gear, a planetary gear carrier comprising a rotatable element, gears mounted to rotate in bearings in said rotatable element with the faces of their teeth engaging the surfaces of said bearings, an axle section driving gear with which the teeth of said gears engage, and means to rotate said rotatable element.

In testimony whereof I sign this specification.

EDGAR U. G. REAGAN.